United States Patent [19]

Spooner

[11] B 4,009,285

[45] Feb. 22, 1977

[54] METHOD FOR PRODUCING CHAMPAGNE

[76] Inventor: James E. Spooner, 3260 A 46th St., Los Alamos, N. Mex. 87544

[22] Filed: Sept. 6, 1973

[21] Appl. No.: 394,742

[44] Published under the second Trial Voluntary Protest Program on April 13, 1976 as document No. B 394,742.

[52] U.S. Cl. .................................. 426/8; 426/15; 195/139

[51] Int. Cl.$^2$ .............................. C12G 1/06

[58] Field of Search ........... 426/8, 11, 15; 195/139, 195/57, 60

[56] References Cited

UNITED STATES PATENTS

| | | | |
|---|---|---|---|
| 2,694,641 | 11/1964 | Atwood et al. ...................... | 426/8 |
| 2,728,672 | 12/1955 | Young et al. ....................... | 426/77 X |
| 2,758,932 | 8/1956 | Scott .................................. | 426/8 |
| 3,425,839 | 2/1969 | Pinnigan ............................. | 426/16 |
| 3,545,978 | 12/1970 | Agabaliants et al. ................ | 426/11 |

*Primary Examiner*—Raymond N. Jones
*Attorney, Agent, or Firm*—Glenn K. Robbins

[57] ABSTRACT

Method for secondary fermentation of champagne in the bottle. In the secondary fermentation process solid of liquid yeast is introduced into the bottle permitting interchange of liquid and gaseous products of fermentation and yeast autolysis by confining the yeast in a semipermeable or porous wall or membrane to prevent the introduction or contamination of the wine with solid components. The yeast may be introduced through a special closure fitting underneath a bottle cap. After the secondary fermentation has been completed the pressure may be reduced by piercing the cap after which the cap and the device containing the yeast are removed. Sweetening of the champagne material is then accomplished to complete the process.

3 Claims, 5 Drawing Figures

METHOD FOR PRODUCING CHAMPAGNE

BACKGROUND OF THE INVENTION:

Champagne is conventionally prepared by a secondary fermentation of wine in containers or receptacles of one gallon or less capacity. In the conventional process a blend of dry stabilized wine is mixed with sugar and a fermenting medium composed of yeast in liquid suspension after which the bottle is stoppered. The bottles are then stacked and permitted to undergo secondary fermentation which produces carbon dioxide and by autolysis of the yeast cells provides aroma and flavor typical of the "methode champagneoise". Solid materials are produced providing sedimentation required to be collected in the neck of the bottle in a socalled "riddling" process. The sediment is removed first by cooling the bottles and then the inverted neck is frozen to form a plug of ice incorporating the solids or sediment. The bottles are then manually opened and the ice and sediment are "disgorged" by the pressure within the bottle which entails some loss of pressure and material. The champagne in the conventional process is then ready for adjustment to the desired sweetness after which the bottle is closed.

In the conventional process considerable time, space and cost is involved. By means of the instant invention time, space and energy requirements have been substantially reduced by physically separating solid or liquid yeast from the main body of fermenting wine permitting the interchange of liquid and gaseous products of fermentation and autolysis to eliminate the "riddling" process. Further by physical separation of yeast in a confining porous wall or membrane the spent yeast and solid by-products can then be removed without the requirement of freezing and with the attendant loss of material. Further where desired, the proposed device contemplates the opening of the bottle without cooling by slowly reducing the pressure prior to removing the closure of the bottle which can be accomplished by piercing the bottle cap and allowing a slow pressure drop to obviate excess foaming and loss of material.

The yeast can where desired be incorporated with sugar in a porous membrane plastic package, such as for example polyvinyl chloride membrane having a mean pore size of up to two micrometers, which retains the yeast cells having an average size of two to eight micrometers. Further, where desired, the entire crown cap and yeast and sugar container can be made in integral form but it will be understood that the porous wall need be formed in only a portion of the container.

By means of the process and apparatus of this invention, an improved method of making champagne has been devised which greatly minimizes the time and space and energy requirements. Further the process can be carried out with greatly simplified process controls and has utility in primary fermentation processes such as in wine making and also brewing of malt liquors and the like.

The above features are objects of this invention and further objects will appear in the detailed description which follows and will be otherwise apparent to those skilled in the art.

For the purpose of illustration of this invention there are shown in the accompanying drawings preferred embodiments thereof. It will be understood that these drawings are for the purpose of illustration only and that the invention is not limited thereto.

Figure 5:
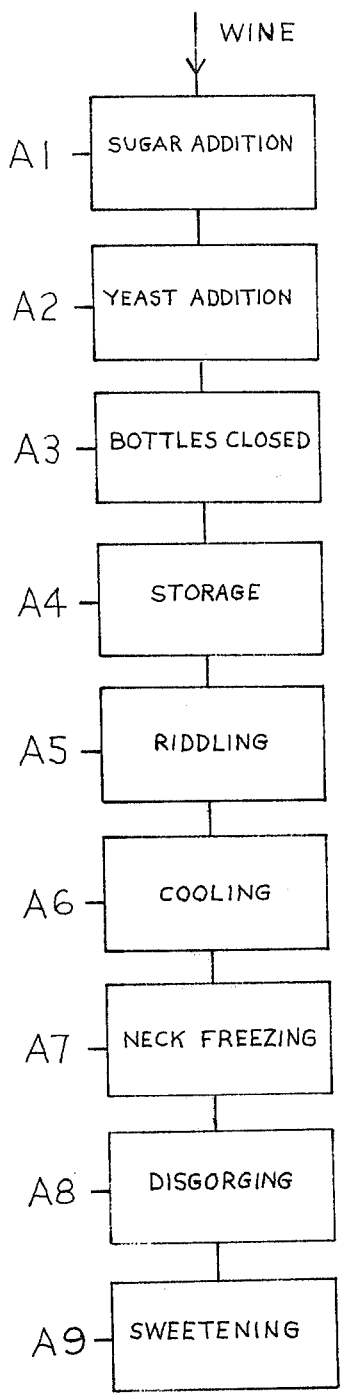
FIG. 5 is a schematic presentation of the conventional champagne process and the improved champagne process of this invention.
Figure 5:
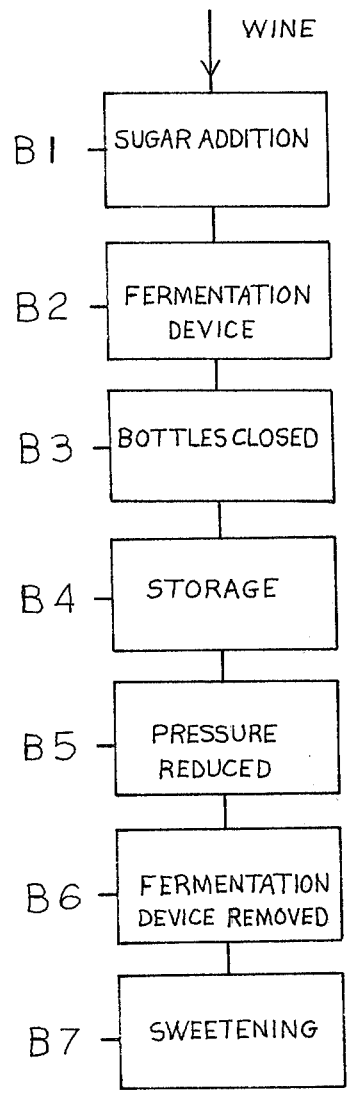

DESCRIPTION OF THE INVENTION:

The present method of producing champagne is conventionally accomplished by for example a nine step process as shown in steps A1 through A9 in the schematic process of FIG. 5. In this procedure A the following steps are employed:

Step A1: A blend of dry stabilized wine is mixed with sufficient sugar to produce the desired pressure of carbon dioxide conventionally four to six atmospheres. This solution is filled into champagne bottles of one gallon or less.

Step A2: The fermenting medium composed of an actively fermenting champagne yeast is used in liquid suspension and added to the bottle.

Step A3: The bottle is stopped with an appropriate closure such as a crown cap or cork and "agrafe".

Step A4: The bottles are then stacked for sufficient time to allow the secondary fermentation to proceed to completion and allow autolysis of the yeast cells.

As a result of the secondary fermentation carbon dioxide is produced which gives the champagne its characteristic effervescence. Autolysis of the yeast cells releases proteins and other products which give desireable aroma and flavor constituents typical of the "methode champaneoise". The secondary fermentation produces in addition to the foregoing a significant amount of solid yeast components which must be separated from the champagne bottle.

Step A5: This separation is accomplished by transferring the bottles to racks where the bottles are supported with the necks downward. Periodically the bottles are lifted and dropped into place so that the yeast deposits are gradually moved downward and onto the closure. This process is known as "riddling" and is performed manually and may take from several weeks to several months to complete. In order to extract the sediment now laying on the closure and to separate it from the champagne the following steps are taken.

Step A6: The bottles are cooled in order to minimize loss of dissolved carbon dioxide and resultant foaming and loss of material in Step A8.

Step A7: The bottle necks are frozen by placing in a liquid cooled to below 5° Fahrenheit in order to form a plug of ice which incorporates and traps the sediment.

Step A8: The bottles are then manually opened by removing the crown cap or "agrafe" and the plug of ice and sediment is disgorged by the pressure within the bottle. Some loss of pressure and material is realized in the disgorging process. The champagne is now ready for the last step in the process. Step A9: The champagne is adjusted to the desired sweetness and proper volume and the final closure is inserted.

In the process of manufacturing champagne the character and quality produced by bottle fermentation in containers or receptacles of up to on gallon in size is recognized and protected by federal regulation, i.e., Code of Federal Regulations: Title 27, Article 4.21b2 and 3.

It is apparent that the manual operations in the conventional process just described are costly in terms of time, space and money resources and energy requirements and it is a goal of this invention to minimize the use of these resources and reduce the time requirements. By means of this invention the yeast is physically separated from the main body of fermenting wine yet permitted to contact the liquid and gaseous products of fermentation by permeation of these products through the permeable membrane. Thus the "riddling" process in the afore-mentioned Step A5 is eliminated without affecting the quality and characted of the champagne. Further, means are provided for removing the spent yeast from the bottles without the requirement of freezing, as in Step A7, without the concommitant loss of champagne. Also by the method and apparatus of this invention the rate of secondary fermentation and yeast autolysis can be increased by the use of a dry yeast as the fermenting medium. An optional feature of the apparatus or device of this invention will permit opening of the bottle, without the cooling of the bottle described in Step A6, by slowly relieving or reducing the pressure prior to removing the closure of the bottle. The rate of pressure reduction can be controlled internally or externally so that excess foaming and loss of liquid material is minimized in the final removal of the bottle closure.

Figure 1:
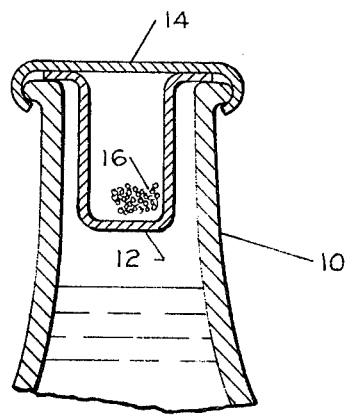
FIG. 1 is a view in vertical cross section of the top portion of a bottle provided with a closure cap and a yeast containing device.

Reference will now be had to FIG. 1 showing a conventional upper portion of a bottle 10 provided with a porous membrane container 12 fitting over the top of the bottle. A closure 14 such as a crown cap or the like is fitted over the cup-shaped membrane 12. The container 12 contains solid yeast 16 but it will be understood that it may also be filled with a liquid yeast and if desired sugar. A porous membrane such as polyvinyl chloride is used having pore size of ½ to 2 micrometers which is sufficient to retain the yeast cells having a diameter of greater than 2 micrometers while permitting interchange of the liquid components and passage therethrough in the membrane. It will also be understood that other semi-permeable or porous membranes or screens or filters constituting the entire container or a portion thereof may be employed such as fiberglass, fritted glass and nylon as long as the porosity is of sufficient magnitude to retain the solid components while permitting the interchange of the liquid components through the membrane in the champagne producing process.

Figure 2:
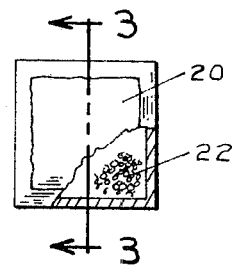
FIG. 2 is a plan view partially broken away in section showing a semi-permeable package containing yeast.
Figure 3:
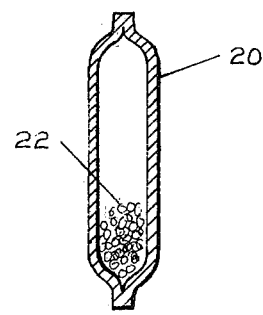
FIG. 3 is a view in section taken on line 3—3 of FIG. 2.

FIGS. 2 and 3 show a package 20 filled with yeast 22 which may be as desired a yeast and sugar mixture made up in sufficient dosage to satisfy the requirements for secondary fermentation. It will be understood that the dosage may vary depending upon the bottle size. Package 20 may be made of the same materials as described in connection with the container 12 of FIG. 1 such as polyvinyl chloride and the like. The package 20 is used similarly to the yeast dosage 16 in FIG. 1 by simply placing it in the container 12 with it being understood that other types of containers or other means of affixation to the cap 14 at the top of the bottle may be employed in order that the package can be simply removed at the completion of the secondary fermentation process. Where the package has a porous wall such as described in this invention this wall may replace the required porous wall of the container, since only one such restrictive wall passageway is required.

Figure 4:
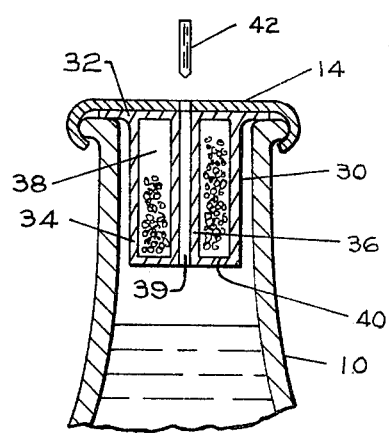
FIG. 4 is a view in vertical section of a modified yeast containing device with a closure cap and having a restricted pressure drop opening.

FIG. 4 shows a modified type of fermentation device useable with a crown cap 14. The modified device, generally indicated by reference numeral 30, employs a circular support disc 32 fitting over the rim of the bottle top and provided with an outer ring 34 and an inner ring 36 defining an annular compartment or space 38 and a central restricted opening or narrow passageway 39. A porous membrane 40 is affixed to the bottom in order to retain yeast filled in the compartment 38 either as a liquid or as a solid. The reduced opening 39 provides for controlled pressure drop when the crown cap 14 is pierced by a piercing tool or needle 42 as shown in the drawing.

The supporting structure such a the cagelike housing 30 shown in FIG. 4 may for example be made of high density polyethelene which permits easy manufacture and does not cause any contamination in the flavor components in the finished product. Other conventional materials may be used as will be obvious.

Although either dry yeast or a liquid suspension of yeast and a mixture with sugar as desired can be used for the fermenting medium the volume of the device supporting the yeast or the package 20 will be minimized by the choice of a dry yeast. The choice of a dry yeast for the fermenting medium also facilitates bulk measurement of the yeast introduced into the bottle and maximizes convenience to the user and the device can be supplied as a complete unit which eliminates the need for the user to add the fermenting medium as a separate step in the manufacturing process.

The process of this invention incorporating the use of the yeast retainer membrane 12 shown in FIG. 1 or the supporting structure 30 of FIG. 4, with the understanding that a dosage package 20 such as shown in FIG. 2 and 3 can be employed, is illustrated by steps B1 through B7 in the schematic diagram shown in FIG. 5.

Step B1: This is the same as conventional Step A1 where a blend of dry stabilized wine mixed with sufficient sugar to produce the desired pressure of carbon dioxide is introduced into a champagne bottle of less than 1 gallon.

Step B2: A sterilized fermentation device of this invention is introduced into the neck of the bottle and yeast added as necessary.

Step B3: This is the same as Step A3 where the bottle is stoppered with an appropriate closure such as a crown cap.

Step B4: This is the same as Step A4 where the bottles are stacked and stored to allow secondary fermentation to proceed.

Step B5: The bottle is pierced such as with the needle 42 in FIG. 4 to allow the pressure within the bottle to reduce to atmospheric pressure.

Step B6: The crown cap closure and fermentation device are removed.

Step B7: This is the same as Step A9 where the champagne is adjusted to the desired sweetness and brought to proper volume and the final closure is inserted.

As can be seen by the process of this invention Steps A5, A6 and A7 which are the "riddling" process, the cooling of the bottle and freezing of the neck, are eliminated thereby greatly reducing time and labor involved. Energy requirements in cooling and freezing are also eliminated to greatly reduce the cost and labor involved. The process of this invention can be automated as contrasted to the manual operation of the conventional procedure which culminates with the manual disgorging in Step A8 obviated by the instant invention. Because the necessity for a granular yeast precipitate is eliminated by the use of this invention, the choice of a yeast can be directed exclusively to improving the efficiency and quality of the fermentation process.

Various changes and modifications may be made within this invention as will be readily apparent to those skilled in the art. Such changes and modifications are within the scope and teaching of this invention as defined by the claims appende hereto.

What is claimed is:

1. A fermentation process for producing champagne which comprises placing a fermentable liquid in a pressure sealable receptacle and introducing in said receptacle a yeast held within a container having a porous wall membrane, said container being out of contact with said liquid, causing said fermentable liquid to contact the contained yeast and thereby causing fermentation to take place, said porous wall membrane having openings of a mean pore size sufficient to retain the yeast cells having a diameter greater than the pores in the membrane while permitting the interchange of the liquid components and passage therethrough in the membrane and small enough to bar the passage of any solid yeast and solid fermentation byproducts, and removing the container and retained solids after the fermentation has been effected to the desired stage, the fermentable liquid being a wine and sugar solution, and a secondary fermentation process being carried out under secondary fermentation conditions of temperature and for a period of time sufficient to produce champagne.

2. The process of claim 1 in which the receptacle is a bottle and the container holding the yeast is retained at the top portion of the bottle.

3. A fermentation process for producing champagne which comprises placing a fermentable liquid in a receptacle and introducing in said receptacle a yeast held within a container having a porous wall membrane, causing said fermentable liquid to contact the contained yeast and thereby causing fermentation to take place, said porous wall membrane having openings of a mean pore size up to two microns sufficiently large to permit the passage of the liquid therethrough and small enough to bar the passage of any solid yeast and solid fermentation by-products, and removing the container and retained solids after the fermentation has been effected to the desired stage, said receptacle being a pressure sealable bottle and the container holding the yeast being yeast being retained at the top portion of the bottle, the internal pressure within the bottle being reduced at a controlled rate before the container and retained solids are removed and the fermentable liquid being a wine and sugar solution and a secondary fermentation being carried out under secondary fermentation conditions of temperature and for a period of time sufficient to produce champagne.

* * * * *